2,816,915

SEPARATION OF PHENYL-SERINES

Walter A. Gregory, Wilmington, Del., assignor to E. I. du Pont de Nemours and Company, Wilmington, Del., a corporation of Delaware No Drawing. Application November 20, 1953, Serial No. 393,491

4 Claims. (Cl. 260—516)

This invention relates to a process for the manufacture of 1-phenyl-2-amido-1,3-propanediols having a sulfur-containing group attached to the para position of the phenyl nucleus, and to intermediates produced therein.

More particularly, my invention is directed to a process of condensing a substituted benzaldehyde with glycine, separating the isomeric phenylserines so obtained by means of the difference in solubility of their cupric-ammonium salts, recovering the water-insoluble threo form of the substituted phenylserine from the cuprammonium complex, esterifying the threo form of the substituted phenylserine, reducing the resulting ester with lithium metal hydride, and acylating the threo aminodiol thus obtained.

The process of my invention is used to prepare phenyl-amidopropanediols of the formula:

1. 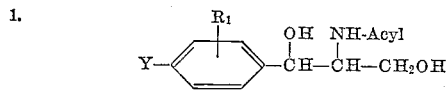

where Y is a sulfur-containing radical of the group consisting of alkyl sulfonyl, haloalkylsulfonyl, phenyl sulfonyl, alkoxyalkyl sulfonyl, beta-hydroxyethylsulfonyl, alkylmercapto, phenylmercapto, hydroxyalkylmercapto, sulfamyl, alkylsulfamyl, and beta-hydroxyethylsulfamyl; $R_1$ is hydrogen, halogen, lower alkyl, or lower alkoxy; and acyl is a carboxylic acid acyl radical.

The substituted sulfonylphenylamidopropanediols of Formula 1, such as, for instance $(dl)$-threo-1-(p-methylsulfonylphenyl)-2-alpha, alpha - dichloracetamido) - 1,3-propanediol, are fully described and claimed in my co-pending United States application, Serial No. 257,986, filed November 23, 1951 now abandoned. They have useful bactericidal properties and find special use in the control of rickettsial infections.

The sulfamyl and substituted sulfamylphenyl-amidopropanediols of Formula 1, such as, for instance, $(dl)$-threo-1-(p-dimethylsulfamylphenyl) - 2 - (alpha, alpha-dichloracetamido)-1,3-propanediol, are also useful in the control of bacterial and rickettsial infections and are fully described and claimed in my copending United States application Serial No. 296,959, filed July 2, 1952 now U. S. Patent 2,680,135.

The alkylmercaptophenylamidopropanediols of Formula 1 are fully described by Royal A. Cutler et al. in an article appearing in the November 5, 1952 issue of Journal of the American Chemical Society (J. Am. Chem. Soc. 74, 5475–5481 (1952)).

It will be understood that all of the compounds prepared by the process of my invention and represented by Formula 1 may exist in optical isomeric form. Stereoisomeric forms as used herein refer to the spatial arrangement of the polar groups on the two asymmetric carbon atoms with reference to erythrose and threose. To differentiate between these two possible forms the diastereoisomeric pair related to erythrose in configuration will subsequently be designated as the erythro series and the diastereoisometric pair related to threose as the threo series or form.

Both the threo and erythro forms exist as racemates of optically active dextro $(d)$ and levo $(l)$ rotatory isomers as well as in the form of the individual or separated dextro $(d)$ and levo $(l)$ optical isomers.

In view of the difficulty of representing the various optical isomers with plane formulas, I have used the customary structural formulas and adopted the following convention in order to designate their optical configuration. Where the formula represents a specific optical configuration, an appropriate notation is used under the formula, for example $(l)$-threo form, $(l)$-erythro form, $(d)$-threo form, $(dl)$-threo form and the like.

It will be understood that where no notation appears with a structural formula or with a chemical name the formula or name is to be interpreted in its generic sense; that is, as representing the $(l)$-threo or $(d)$-threo isomers in separated form as well as the $(dl)$-threo optical racemates. In other words, a formula or name represents not only the unresolved mixture of isomers but also the individual isomers and racemates.

Using the above conventions, the process of the present invention can be diagrammatically represented as follows:

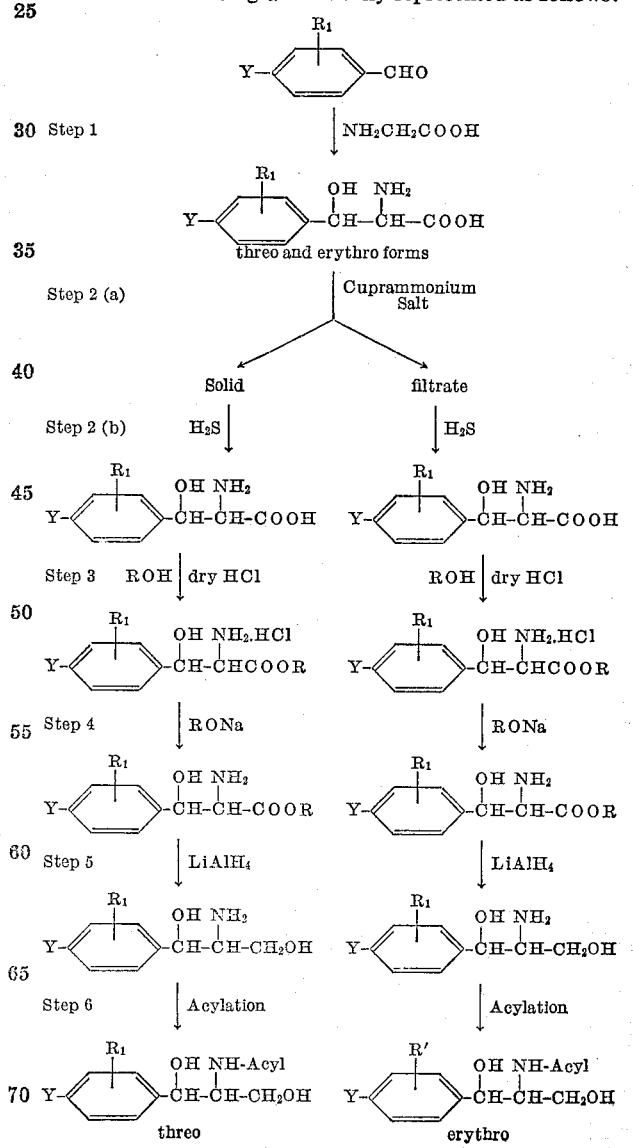

where Y, $R_1$ and acyl have the same significance as in Formula 1.

Step 1 of the process of the present invention involves the condensation of a substituted benzaldehyde of the formula 2.
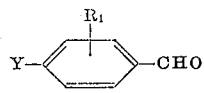

where Y and $R_1$ have the same significance as in Formula 1, with glycine in the presence of a base to obtain a mixture of two diastereoisomers having the formula 3.
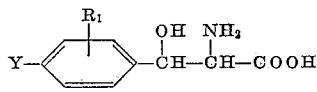

The compounds of Formula 2 where Y is alkylmercapto can be prepared in accordance with the process fully described and claimed in my copending joint U. S. application with Algird Kreuchunas, Serial No. 390,238, filed November 4, 1953, now U. S. Patent 2,761,873.

In brief, the pertinent process of Gregory and Kreuchunas U. S. 2,761,873, comprises reacting in a liquid medium a mercaptide of the formula 4.  $R_2SM$ where $R_2$ is alkyl, hydroxyalkyl, carboxyalkyl or aryl and M is sodium or potassium with a benzaldehyde of the formula 5.
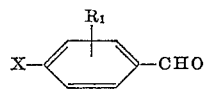

where X is chlorine, bromine or iodine and $R_1$ is hydrogen, halogen, lower alkyl or lower alkoxy. The resulting products have the formula 6.
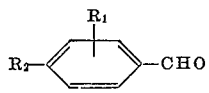

where $R_1$ and $R_2$ have the same significance as in Formulae 4 and 5.

The substituted benzaldehydes of Formula 6 where Y contains a sulfamyl or sulfonyl group can be prepared in the manner described by Burton and Hu, J. Chem. Soc. (London) 601–5 (1948) May.

Typical of the substituted benzaldehydes of Formula 2 which can be employed in step 1 of my invention there may be mentioned:

p-Methylmercaptobenzaldehyde
p-Chloromethylmercaptobenzaldehyde
p-Methylmercapto-2-fluorobenzaldehyde
p-n-Butylmercapto-2-methylbenzaldehyde
p-Phenylsulfonylbenzaldehyde
p-Methylmercapto-3-chlorobenzaldehyde
p-Hydroxyethylmercaptobenzaldehyde
p-Hydroxymethylsulfonylbenzaldehyde
p-Ethylmercaptobenzaldehyde
p-Methylsulfonylbenzaldehyde
p-Chloromethylsulfonylbenzaldehyde
p-Methylsulfamylbenzaldehyde
p-Dimethylsulfamylbenzaldehyde
p-Sulfamylbenzaldehyde
p-[N, N-bis-(2-hydroxyethyl)sulfamyl]benzaldehyde
p-Trifluoromethylsulfonylbenzaldehyde
p-Methoxymethylsulfonylbenzaldehyde
p-Phenylmercaptobenzaldehyde
p-Diethylsulfonylbenzaldehyde
3-chloro-4-dimethylsulfamylbenzaldehyde
p-Ethylsulfonylbenzaldehyde
p-Dichloromethylsulfonylbenzaldehyde
p-Fluoromethylsulfonylbenzaldehyde
p-Difluoromethylsulfonylbenzaldehyde The mixing of glycine with the substituted benzaldehyde is effected in an aqueous basic medium. Any of a wide variety of basic substances in the presence of water may be employed. There may be used, for instance, tertiary-amines, alkali metal hydroxides and the like. Of these, I particularly prefer triethylamine. Aqueous sodium hydroxide is also preferred.

It is preferable to carry out the reaction between the glycine and the substituted benzaldehyde over a period of at least 24 hours. An extended period of reaction increases the yield of the threo form. However, shorter reaction periods may be employed, particularly in those instances where the erythro form is desired.

The reaction mixture is acidified and stirred to hydrolyze the Schiff's base which is formed as an intermediate. The unreacted aldehyde and that released by the hydrolysis can be filtered from the solution in those cases where the aldehyde is a solid or can be extracted with an appropriate organic solvent such as for instance, chloroform, methylene chloride, benzene, ethylacetate, ether, and the like.

The pH of the reaction mixture is brought to the isoelectric point of the product and filtered. The material which is collected upon filtration is a para-substituted phenyl serine and consists of a mixture of two diastereoisomers, the threo form and the erythro form.

Step 2 of the process shown above is a novel method for separating these isomers. Advantage is taken of the difference in solubility of the cuprammonium complexes of the two forms in dilute aqueous ammonia to achieve the desired separation. The insoluble cuprammonium complex of the threo form can be converted to the threo serine by one of several methods. The complex may be suspended in aqueous acid solution and the copper precipitated as the sulfide with hydrogen sulfide. In this case, the product remains in the acid solution and may be filtered free of copper sulfide and precipitated by adjusting the pH to the isoelectric point of the threo serine.

Alternatively, the copper complex may be suspended in water and 2-mercaptoethanol added until the blue color is discharged. The pH of the solution is adjusted so that the serine separates leaving the 2-mercaptoethanol copper complex in solution.

Still another method of converting the cuprammonium complex to the threo serine is to suspend the complex in water and to add the ammonium salt of ethylenediamine tetraacetic acid until the complex dissolves and the product separates. The pH is adjusted to the isoelectric point to give maximum insolubility of the product. Other salts of ethylenediamine tetracetic acid, for example, alkali metal salts, may be used in place of the ammonium salt.

The cuprammonium salts of the threo-p-substituted phenyl serines of formula 3, which are produced in accordance with step 2(a), are useful as fungicides and as blue pigments for paints. The cuprammonium salt of the threo serine prepared by mixing 2-(p-methylsulfonyl)-phenyl serine with cupric ammonium acetate has properties which make it particularly useful in the above indicated fields. Another ammonium complex which is of special value is the cuprammonium salt of threo-2-(p-methylmercaptophenyl)serine.

The erythro form of the serine may be recovered from the soluble cuprammonium salt by one of the three methods outlined above for the threo form.

Any of a variety of cuprammonium salts can be used in step 2 of the process of my invention. Cupric ammonium acetate and cupric ammonium sulfate are two of the preferred salts.

The separated serines can then be esterified in accordance with step 3 of the diagram found in column 2, lines 25 to 70 of this specification. For the sake of simplicity, the process of the invention will be further explained with particular reference to the manufacture of the threo compounds.

The threo compounds of Formula 1 are substantially more active biologically than the corresponding erythro isomers. It will be understood, however, that the erythro form of the substituted phenyl serine can be carried thru steps 3–6 of my invention in the manner shown in column 2, lines 45 to 70.

In practicing step 3 of my process, the serine resulting from step 2(b) is esterified with an aliphatic monohydric alcohol, preferably those containing from 1 to 6 carbon atoms, by passing anhydrous hydrogen chloride thru a mixture containing the serine and the absolute alkanol. The ester hydrochloride is produced.

The free ester can be readily obtained by suspending the hydrochloride in alcohol and adding an alkali metal alkoxide. It is preferred to add an alcohol solution containing sodium alcoholate such as sodium methylate, sodium ethylate, and the like, in an amount at least equivalent to the hydrochloride. In the cases where the ester is insoluble in water it is recommended to dissolve the ester hydrochloride in cold water and free the aminoester by the addition of aqueous alkali.

The compounds, which have the general formula

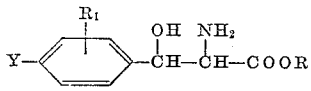

where Y and $R_1$ have the same significance as in Formula 1 and R is hydrogen or a lower alkyl radical, are useful as corrosion inhibitors for metals.

In step 5 of the process of my invention the ester is reduced to an aminopropanediol with lithium aluminum hydride or with lithium borohydride. The reduction is carried out in an inert solvent such as, for instance, diethyl ether, tetrahydrofuran, and dioxane. I have found that the reduction of esters, particularly those containing the sulfonyl group, is substantially facilitated by the presence of tetrahydrofuran.

The aminodiol obtained from step 5 is readily acylated to the biologically active dl-threo forms of the amides of Formula 1, wherein acyl represents a saturated lower aliphatic acyl, halogen substituted lower aliphatic acyl, ether substituted lower aliphatic acyl, substituted and unsubstituted alicyclic acyl, heterocyclic acyl, and aromatic acyl. Any of a wide variety of acylating agents may be used. There may be used, for instance, methyl dichloroacetate, acetic anhydride, methyl chloracetate, methyl dibromoacetate, methyl difluoroacetate, methyl phenylacetate, dichloroacetyl chloride, chloral cyanhydrin, methyl benzoate, methyl propionate, benzoyl chloride, succinic anhydride, phthalic anhydride, and the like. When an ester is used as an acylating agent, a suitable medium for carrying out the acylation is a lower alcohol such as methanol or ethanol. When an acid chloride or an anhydride is used as the acylating agent the reaction may be carried out in an aqueous or inert organic medium by the addition of a base.

In order to better understand my invention, reference should be had to the following illustrative examples:

Example 1

Preparation of (dl)-threo-1-(p-methylsulfonylphenyl)- 2-(alpha,alpha-dichloroacetamido)-1,3-propanediol

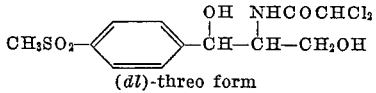

(dl)-threo form

A mixture consisting of 300 g. of glycine, 1273 g. of p-methylsulfonylbenzaldehyde in 2 liters of triethylamine and 3 liters of distilled water is stirred at normal room temperature for a period of 24 hours. The reaction mixture is then sparged with nitrogen for a period of one hour and stirred with 5 liters of benzene. A heavy gummy precipitate separates.

The gummy solid and water layer is cooled to a temperature of 12° C. and made acid by adding 1500 ml. of concentrated hydrochloric acid. The gum dissolves upon the addition of the acid and crystalline p-methylsulfonylbenzaldehyde separates.

The p-methylsulfonylbenzaldehyde is recovered. The aqueous filtrate is brought to a pH of 7 by the addition of 1040 ml. of concentrated ammonium hydroxide. An additional small amount of p-methylsulfonylbenzaldehyde crystallizes from the solution. Isolation of the desired product, 2-(p-methylsulfonyl)phenyl serine, is facilitated by concentration of the solution. A total yield of crude product is in excess of 900 grams.

The crude product is stirred with 1600 ml. of acetonitrile, filtered, collected and washed with an equal amount of acetonitrile. The dried 2-(p-methylsulfonyl)phenyl serine amounts to about 615 g. It decomposes at a temperature of from 200 to 205° C. A small portion of the dry product is recrystallized from water and has a melting point of 218–220° C. (dec.). The product, 2-(p-methylsulfonyl)phenyl serine, has the following formula:

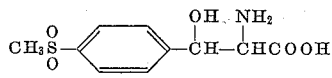

Analysis—Calculated for $C_{10}H_{13}NO_5S$: C, 46.32; H, 5.05; N, 5.40. Found: C, 46.27; H, 5.32; N, 5.34.

Six hundred and fifteen grams of 2-(p-methylsulfonyl)-phenyl serine is stirred with 3 liters of cupric ammonium acetate solution. The cupric ammonium acetate solution is prepared by dissolving 600 g. of cupric acetate monohydrate in 3 liters of water and 750 cc. of concentrated ammonium hydroxide.

A blue precipitate forms. It is filtered, collected, washed with an additional quantity of cupric ammonium acetate solution, then with water until the filtrate is colorless. The blue copper salt is dried.

The dry copper salt weighing about 431 grams is suspended in 4 liters of water containing 400 cc. of glacial acetic acid. The suspension is warmed to a temperature of 50° C. Hydrogen sulfide gas is passed into the solution for a period of 5 hours. Cupric sulfide formed is removed by filtering the reaction mixture using Celite filter aid. The filter cake is extracted by boiling with 2 liters of water. The cake-water mixture is then filtered. The filtrates are combined and neutralized with concentrated ammonium hydroxide. The neutralized solution is concentrated under reduced pressure.

The desired product, threo-p-methylsulfonylphenyl serine, separates as crystals from the concentrated solution. These crystals are collected by filtration and washed with 1300 ml. of 95% ethanol. The crystals are dried to yield 258 grams of threo-p-methylsulfonylphenyl serine, M. P. 219–221° C. A further quantity of product may be obtained from the filtrate.

A mixture consisting of 273 grams of threo-p-methylsulfonylphenyl serine and 2700 cc. of absolute ethanol is treated with a rapid stream of anhydrous hydrogen chloride for a period of thirty minutes. The mixture is refluxed for a period of four hours, cooled and permitted to stand overnight. The resulting ethanol ester of threo-p-methylsulfonylphenyl serine hydrochloride is collected by filtration, washed with ether and dried, M. P. 160.5–162.5° C. (as the hydrochloride).

The free ester is obtained by suspending the hydrochloride in absolute ethanol, and adding an alcohol solution containing an equivalent of sodium methylate. The solution is filtered to remove the sodium chloride. The filtrate is concentrated under reduced pressure. The crude free ester has a melting range of 120–126° C. Upon recrystallization from chloroform, the ethyl ester of threo-p-methylsulfonylphenyl serine melts at 128–129° C. It has the following formula:

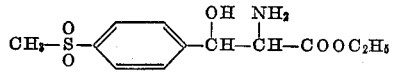

Analysis.—Calculated for $C_{12}H_{17}O_5NS$: C, 50.16; H, 5.97; N, 4.88. Found: C, 49.96; H, 6.22; N, 4.95.

To a solution of 28.5 grams of lithium aluminum hydride in 1 liter of ether there are added 500 cc. of absolute tetrahydrofuran followed by 70 g. of threo-p-methylsulfonylphenyl serine, ethyl ester. The addition requires a period of about 25 minutes. The reaction mixture is allowed to stand for a period of one hour. It is then refluxed for a period of 80 minutes.

After another 1700 cc. portion of absolute ether has been added to the mixture, the mixture is refluxed for a period of one hour. The mixture is cooled and treated successively with 25 cc. of ethyl acetate, 200 cc. of 95% ethanol and 500 cc. of water.

The reaction mixture is filtered and the filter cake washed with methanol. The filtrate is concentrated under reduced pressure, treated with a solution of 30 g. oxalic acid in 200 cc. of methanol, concentrated substantially to dryness and diluted with 200 cc. of absolute ethanol. The oxalate salt is collected by filtration and dried to give a yield of 12 grams.

The filter cake is extracted continuously with absolute methanol. The extract is treated with a solution of 30 g. of oxalic acid in 250 cc. of absolute ethanol. This results in an additional 53 g. of crude oxalate salt.

The crude oxalate salt which contains lithium oxalate is then purified. 65 g. of the crude material is dissolved in 640 cc. of cold distilled water. The solution is filtered and the filtrate diluted with 1740 cc. of absolute ethanol. A white solid separates and is collected by filtration. The filtrate is concentrated under reduced pressure almost to dryness and then treated with 1 liter of absolute ethanol. The purified oxalate salt is collected by filtration and dried. M. P. 170–178° (dec.).

To prepare the free base, 4.1 g. of oxalate is dissolved in 45 cc. of distilled water and treated with 5% of barium hydroxide solution until the pH of the reaction mixture reaches 9.0. The barium oxalate is removed by filtration. The filtrate is concentrated under reduced pressure to dryness. The solid residue which results is treated with 50 cc. of hot methanol. The methanolic mixture is filtered to remove any barium oxalate. The filtrate is concentrated under reduced pressure. The free base is collected by filtration and dried, M. P. 117–122° C.

The crude free base is crystallized from a methanol-benzene mixture and then from ethanol to give material melting at 122–124° C.

An alternative method of preparing the free base is to pass a water solution of the oxalate salt over an anion exchange resin, such, as, for example, a commercially available resin designated as IRA–400, and concentrating the solution to dryness.

The free base, 1-(p-methylsulfonylphenyl)-2-amino-1,3-propanediol, has the formula:

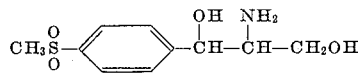

*Analysis.*—Calculated for $C_{10}N_{15}O_4NS$: C, 48.96; H, 6.16; N, 5.71. Found: C, 48.95; H, 6.25; N, 5.58.

A mixture consisting of 22.7 g. of 1-(p-methylsulfonylphenyl)-2-amino-1,3-propanediol, oxalate and 250 ml. of distilled water is treated with a solution of 21.36 g. of barium hydroxide, octahydrate in 250 cc. of water. The barium oxalate is removed by filtration and the aqueous filtrate is concentrated under reduced pressure. The 12 g. of semicrystalline residue is treated with 100 cc. of methanol and 20 cc. of methyl dichloroacetate. The resulting mixture is refluxed for a period of three hours.

The insoluble barium oxalate is removed by filtration and the filtrate is allowed to evaporate in a hood to give 17.8 g. of light yellow, crystalline material, M. P. 169–175° C. This material upon crystallization from acetonitrile gave 14.4 g. of final product, M. P. 179–180° C. The final product consisting essentially of 1-(p-methylsulfonylphenyl) - 2 - (alpha,alpha - dichloroacetamido) - 1,3-propanediol has the formula:

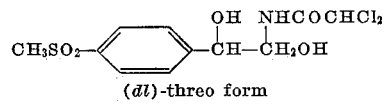

(*dl*)-threo form

*Analysis.*—Calculated for $C_{12}H_{14}O_5NSCl_2$: C, 40.46; H, 4.24; N, 4.04; S, 9.00; Cl, 19.91. Found: C, 40.55; H, 4.28; N, 4.04; S, 9.01; Cl, 19.80.

Example 2

The preparation of (*dl*)-threo-1-(p-methylsulfonylphenyl) - 2 - (alpha,alpha - dichloroacetamido - 1,3 - propanediol

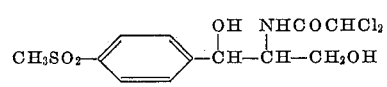

A solution consisting of 103.5 g. of glycine and 345 cc. of water containing 83 g. of sodium hydroxide is stirred vigorously at room temperature as 395.7 g. of p-methylmercaptobenzaldehyde is added.

The temperature of the reaction mixture rises slowly during an hour until it reaches 40° C. The solution becomes yellow-orange in color, and the aldehyde slowly dissolves. At the end of 30 minutes, 100 cc. of ethanol is added and the mixture allowed to stand for a period of twenty-four hours.

The mixture sets to a solid mass of crystals. The mass is broken up, stirred and cooled as 519 cc. of concentrated hydrochloric acid is added. The solid dissolves, and a yellow oil separates along with some solid. The solution is filtered and the filtrate extracted with carbon tetrachloride to remove the p-methylmercaptobenzaldehyde (190 g. is recovered).

The aqueous layer is then combined with the solid and the solution neutralized with ammonium hydroxide. The product crystallizes and amounts to 290 g. This product is a mixture of the threo and erythro isomers of 2-(p-methylmercaptophenyl)-serine.

The threo isomer is separated as follows:

The 290 g. of crude product is stirred well with a cupric ammonium acetate solution prepared from 200 g. of cupric acetate, 1 liter of water and 250 cc. of concentrated aqueous ammonium hydroxide. A dense light blue precipitate separates from the solution. This precipitate is filtered, collected and washed with distilled water. The filtrate contains the erythro isomer.

The precipitate is suspended in 1 liter of water. To this there is added 2-mercaptoethanol until the blue color is gone. Then an additional 100 cc. of 2-mercaptoethanol is added. The pH of the solution is adjusted to 8.5 by adding ammonium hydroxide. The white solid is collected by filtration and washed with water. It may be crystallized from water by adding ammonium hydroxide until it is in solution and then acidifying. The product separates as white crystals, M. P. 173–175° C.

*Analysis.*—Calculated for $C_{10}H_{13}NO_3S$: C, 52.85; H, 5.76; N, 6.16. Found: C, 52.32; H, 5.97; N, 6.28.

Dry hydrogen chloride is passed into a stirred suspension of 98 g. of (*dl*)-threo-2-(p-methylmercaptophenyl)-serine in 1 liter of absolute ethanol. The temperature of the reaction mixture rises and the solid dissolves rapidly. At the end of 20 minutes heat is applied to the reaction vessel and refluxing is continued for a period of three hours.

The resulting solution is concentrated under reduced pressure and the serine ethyl ester hydrochloride separates as crystals. The ester hydrochloride is filtered, collected and washed with ether. The yield is 75 g., M. P. 139–143° C.

The hydrochloride is dissolved in 500 cc. of ice and water. To this there is added slowly 150 cc. of 5% aqueous ammonia with stirring. The product separates as light tan crystals; yield 62.5 g. melting 87–90° C.

It may be purified by dissolving in cold chloroform and adding cyclohexane to give a product melting 94–94.8° C. The product of this reaction is (dl)-threo-2-(p-methylmercaptophenyl)serine ethyl ester.

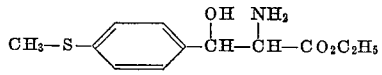

A solution of 17 g. of lithium aluminum hydride in 600 cc. of dry ether is stirred as a solution of 40 g. of (dl)-threo-2-(p-methylmercaptophenyl)serine ethyl ester in 300 cc. of tetrahydrofuran is added over a 75 minute period. The mixture refluxes spontaneously, and after the addition is complete, the refluxing is maintained by applying external heat to the reaction vessel for a period of two hours. The excess lithium aluminum hydride is destroyed by adding a 1:1 mixture of tetrahydrofuran and water.

The mixture is filtered and the filter cake is collected and washed several times with tetrahydrofuran. The filtrate and washings are combined and concentrated under reduced pressure. The crude product melts at 120–125° C. and may be purified by crystallizing from methanol to give a product melting 128–130° C. This product is (dl) - threo - 1 - (p - methylmercaptophenyl) - 2 - amino-1,3-propanediol and has the structure:

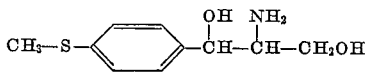

A solution of 8.5 g. of (dl)-threo-1-(p-methylmercaptophenyl)-2-amino-1,3-propanediol is 51 cc. of water containing 8.5 g. of chloral cyanohydrin is cooled to 0° C. and 10 cc. of triethylamine is added over a 5 minute interval. The temperature of the reaction mixture is kept at 0° C. during the reaction and for a period of 4 hours. An oily precipitate separates during the reaction and solidifies. After acidifying the solution with hydrochloric acid, the product is filtered, collected and washed with water. The yield is 13.3 g. melting 80–87° C. The product is purified by crystallization from water and melts 98–99.5° C. This product is (dl)-threo-1-(p-methylmercaptophenyl) - 2 - (alpha,alpha - dichloroacetamido) - 1,3-propanediol and has the following structural formula:

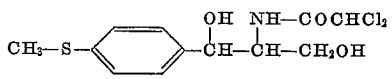

A solution of 5.0 g. of (dl)-threo-1-(p-methylmercaptophenyl - 2 - (alpha,alpha - dichloroacetamido) - 1,3 - propanediol in 30 cc. of acetone is stirred as 7 cc. of 40% peracetic acid is added slowly. The temperature of the reaction mixture is maintained at 35° C. by external cooling. The stirring is continued one hour after the addition is complete, and the product separates as white crystals. The crystals are filtered off, collected, washed with acetone and dried. The product, (dl)-threo-1-(p-methylsulfonylphenyl) - 2 - (alpha,alpha - dichloroacetamido-1,3-propanediol, melts at 180–181° C.

I claim:
1. A process for separating a mixture of two diastereoisomers of the formula

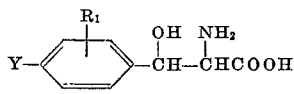

where Y is a sulfur-containing radical of the group consisting of alkyl sulfonyl, haloalkylsulfonyl, phenylsulfonyl, alkoxy-alkylsulfonyl, beta-hydroxyethylsulfonyl, sulfamyl, alkylsulfamyl, beta-hydroxyethylsulfamyl, alkyl mercapto, phenylmercapto, hydroxyalkylmercapto radicals, $R_1$ is a member of the class consisting of hydrogen, halogen, lower alkyl and lower alkoxy radicals, into the threo form and the erythro form, which comprises mixing at ambient temperature an aqueous solution of a cupric ammonium salt of the group consisting of cupric ammonium acetate and cupric ammonium sulfate with a mixture of the threo and erythro forms of a serine of the above formula, said cupric ammonium salt being present in the reaction mixture in at least a molar equivalent amount, collecting the water insoluble cupra-ammonium complex of the threo isomer, freeing the serine from the complex by use of a member of the group consisting of hydrogen sulfide, 2-mercaptoethanol, ethylenediamine tetraacetic acid and alkali metal and ammonium salts of said ethylenediamine tetraacetic acid and collecting the threo form of the serine of the above formula substantially free of the erythro form.

2. The process of claim 1 wherein Y is methylmercapto and $R_1$ is hydrogen.

3. The process of claim 1 wherein Y is methylsulfonyl and $R_1$ is hydrogen.

4. The process of claim 1 wherein Y is sulfamyl and $R_1$ is hydrogen.

References Cited in the file of this patent
UNITED STATES PATENTS

| | | |
|---|---|---|
| 2,376,186 | Rapkine | May 15, 1945 |
| 2,390,764 | Wolff | Dec. 11, 1945 |
| 2,395,529 | Arnold | Feb. 26, 1946 |
| 2,446,651 | Hartung | Aug. 10, 1948 |
| 2,483,885 | Crooks et al. | Oct. 4, 1949 |
| 2,538,792 | Moersch | Jan. 23, 1951 |
| 2,627,525 | Noll et al. | Feb. 3, 1953 |
| 2,628,975 | Jacob et al. | Feb. 17, 1953 |
| 2,699,451 | Moersch | Jan. 11, 1955 |
| 2,717,268 | Rebstock et al. | Sept. 6, 1955 |

FOREIGN PATENTS

| | | |
|---|---|---|
| 500,594 | Belgium | Jan. 31, 1951 |
| 505,140 | Belgium | Aug. 31, 1951 |
| 506,331 | Belgium | Oct. 31, 1951 |
| 513,130 | Belgium | Aug. 14, 1952 |
| 1,017,396 | France | Sept. 17, 1952 |

OTHER REFERENCES

Chem. Abstracts, vol. 22, page 583 (1928).
Jour. Amer. Chem. Soc., vol. 35, pages 1546–1551 and 1584.
Biochem. Jour., vol. 24, pages 1188–1197.
Biochem. Jour., vol. 22, pages 1083–1086 (1928).
Chem. Abstract, vol. 46, page 8637 (1952; vol. 19, pages 75–76 (1925).